(12) United States Patent
Staiger et al.

(10) Patent No.: US 6,349,743 B1
(45) Date of Patent: Feb. 26, 2002

(54) HIGH-PRESSURE HYDRAULIC VALVE

(75) Inventors: Hans Staiger, Cham (CH); Horst Kahl; Markus Eschweiler, both of Remscheid (DE); Jörg Ludwig, Wermelskirchen (DE)

(73) Assignee: Bucher Hydraulics AG, Neuheim (CH)

( * ) Notice: Subject to any disclaimer, the term of this patent is extended or adjusted under 35 U.S.C. 154(b) by 0 days.

(21) Appl. No.: 09/622,440

(22) PCT Filed: Feb. 8, 1999

(86) PCT No.: PCT/CH99/00057

§ 371 Date: Aug. 17, 2000

§ 102(e) Date: Aug. 17, 2000

(87) PCT Pub. No.: WO99/42751

PCT Pub. Date: Aug. 26, 1999

(30) Foreign Application Priority Data

Feb. 20, 1998 (CH) .................................................. 413/98

(51) Int. Cl.⁷ .............................................. F16K 27/00
(52) U.S. Cl. ............................. 137/625.69; 29/890.128; 251/368
(58) Field of Search .................. 137/625.69; 251/368; 29/890.128

(56) References Cited

U.S. PATENT DOCUMENTS

| | | | |
|---|---|---|---|
| 2,985,566 A | * 5/1961 | Tsien et al. | ............. 251/368 X |
| 3,060,970 A | * 10/1962 | Aslan | ..................... 251/368 X |
| 3,559,687 A | 2/1971 | Aslan | .................... 137/625.69 |
| 4,002,318 A | 1/1977 | Koch | |
| 4,770,210 A | 9/1988 | Neff et al. | ................... 137/884 |
| 5,611,370 A | 3/1997 | Najmolhoda | .......... 137/625.61 |
| 5,615,860 A | 4/1997 | Brehm et al. | .......... 251/129.07 |

FOREIGN PATENT DOCUMENTS

EP      0 711 944      5/1996

* cited by examiner

*Primary Examiner*—Gerald A. Michalsky
(74) *Attorney, Agent, or Firm*—Burns, Doane, Swecker & Mathis, L.L.P.

(57) ABSTRACT

The present invention relates to a high-pressure hydraulic valve in which the housing (1) at least and also preferably the operational parts, such as the main control piston (3), the manometer piston (6) and the like which are arranged inside said housing (1) and influence the hydraulic oil flow, are made of an aluminium alloy that can be hardened and tempered. The weight of the high-pressure hydraulic valve can therefore be substantially reduced. The surfaces of the parts made of the aluminium alloy that can be hardened and tempered are advantageously submitted to anodic oxidation in order to increase even more their wear resistance. This type of high-pressure hydraulic valve with a particularly light weight is mainly intended for use in mobile hydraulic systems such as those used in mobile cranes, in lifting platforms and in excavators.

15 Claims, 1 Drawing Sheet

HIGH-PRESSURE HYDRAULIC VALVE

The invention relates to a high-pressure hydraulic system having a valve for varying the flow of hydraulic oil between a pump and a hydraulic load.

Such high-pressure hydraulic valves, in various types and constructions, are employed in mobile hydraulic systems. Examples of such different types are proportional valves, load holding brake valves, and blocking/safety valves. The mobile hydraulic systems are components of dredgers, cranes and other lifting devices, for instance. In such applications, the weight of the hydraulic units plays a role. The weight should be as low as possible.

Typically, the housings of high-pressure hydraulic valves are made from gray cast iron or spherulitic graphite iron, and the internal parts, some of them movable, are made from hardened and tempered steel. The weight of the high-pressure hydraulic valve is determined substantially by the weight of this housing. One such high-pressure hydraulic valve is known from WO92/07208. In U.S. Pat. No. 5,556,075 that matured from this application, it is mentioned as an essential effect of the invention that the weight is quite low. Thus in both of these previously known applications it is proposed that a part of the valve spindle, or the entire valve spindle and valve cone assembly, be produced from a ductile material, such as copper, brass, or in particular aluminum. This is intended to improve the resistance to leakage. In the case where aluminum is used, a reduction in weight is indeed achieved, but in view of a housing whose mass predominates, this reduction is only minimal. A weight reduction for the valve spindle and valve cone assembly also leads to a lower inertial mass and thus to a lesser dynamic pressure loss in periodic switching. Because of the circumstance already mentioned, that the weight of the valve spindle and valve cone assembly is only a small proportion of the total weight, the saving in weight for the high-pressure hydraulic valve intrinsically is not very significant. Furthermore, there is the problem of the different coefficients of thermal expansion of the various materials.

The goal of making machine components as light in weight as possible has existed for a long time. Hence lightweight structural materials have long been employed in a great many fields of industry. As an example, it can be mentioned that such lightweight materials as titanium and aluminum are used in passenger-carrying motor vehicles as well. This is known for instance from U.S. Pat. No. 5,169,460. Since as noted, there has long been a need to reduce weight, it can be concluded that in industrial fields in which such lightweight materials have not yet been used, strong arguments exist that preclude the use of such materials.

The object of the invention is to reduce the weight of a high-pressure hydraulic valve markedly further, without adversely changing its utility. Advantageous refinements will become apparent from the dependent claims.

The total weight of a high-pressure hydraulic valve is definitively determined by its housing. Such shape-related data as size and wall thickness, on the one hand, and the specific weight of the material used on the other, play a significant role. The size of the housing is influenced for instance by the size of the flow through it that is to be controlled, as well as by the structural design that is associated with the mode of operation. The maximum pressure that the high-pressure hydraulic valve has to control also has a determining influence on the housing size, for instance on the minimum thickness of walls. Hydraulic systems that can be classified as high-pressure systems are characterized by operating pressures of more than 100 bar. Systems with a rated operating pressure of 420 bar are known. In this respect it should be noted that precisely in such mobile systems as cranes and dredges, peak loads can certainly occur that exceed the rated operating pressure. Although as a rule safety devices that are intended to prevent greater loads are present, nevertheless even in such cases, dynamic peak loads can occur. The manufacturer of high-pressure hydraulic valves must therefore provide proof that the function and durability of the unit is assured even at pressures that are a multiple of the rated operating pressure, for instance four times the rated operating pressure.

In contrast to the time-tested prior art, in which the gray cast iron or preferably spherulitic graphite iron GGG 40 is used as the housing material and hardened steel is used for the internal parts, it is proposed according to the invention that a precipitation-hardenable wrought aluminum alloy, such as AlZnMgCu, be used as the housing material. Since the specific weight of such an alloy is approximately 2.8 g/cm$^3$, while that of spherulitic graphite iron GGG 40 has a value of 7.25 g/cm$^3$, a saving in weight for the weight of the housing, assuming the same dimensions, of about 60% is attainable.

Often, housing parts for high-pressure hydraulic valves are made not from molded castings but rather from solid blocks. On the one hand this is because the numbers of pieces are so low that producing molds and mold cores for the internal hollow spaces is unfeasible because of the high cost, and on the other because often a plurality of parts are combined as elements that can be lined up to make larger units. Here there are advantages if the housings have a blocklike shape. In such blocklike housings, the absolute weight advantage, expressed in kilograms per component, is especially significant when a precipitation-hardenable aluminum alloy is used instead of spherulitic graphite iron GGG 40.

The mechanical specifications for the above materials, such as tensile strength, Brinell hardness, modulus of elasticity, and tensile yield strength, have long been known. Although the tensile strength and the tensile yield strength of precipitation-hardenable aluminum alloys are for instance higher than the corresponding values for spherulitic graphite iron GGG 40, the profession has long shied away from using precipitation-hardenable aluminum alloys as material for the housings of high-pressure hydraulic valves.

What evidently also stood in the way of the solution according to the invention was that the wear resistance of spherulitic graphite iron GGG 40 is considered to be extraordinarily high, while aluminum alloys in general are not considered especially abrasionproof. However, as tests have shown, in hydraulic equipment this aspect lacks overriding significance, because the hydraulic oil present in such equipment acts as a lubricant in the event of sliding stress. As an advantageous feature of the invention, however, a surface treatment of the components made from the aluminum alloy can be done, preferably an anodic oxidation. Such methods have already long been known per se. One advantageous method for the intended purpose is the creation, by the method known as HART-COAT® (trademark of the corporation doing business as AHC-Oberflächentechnik, Friebe & Reininghaus GmbH), of a coating with a comparatively very slight pore volume. In this method, the anodic oxidation takes place in a specially composed acid electrolyte, which is cooled during the process.

An exemplary embodiment of the invention will be described in further detail below in conjunction with the drawing.

Figure 1:
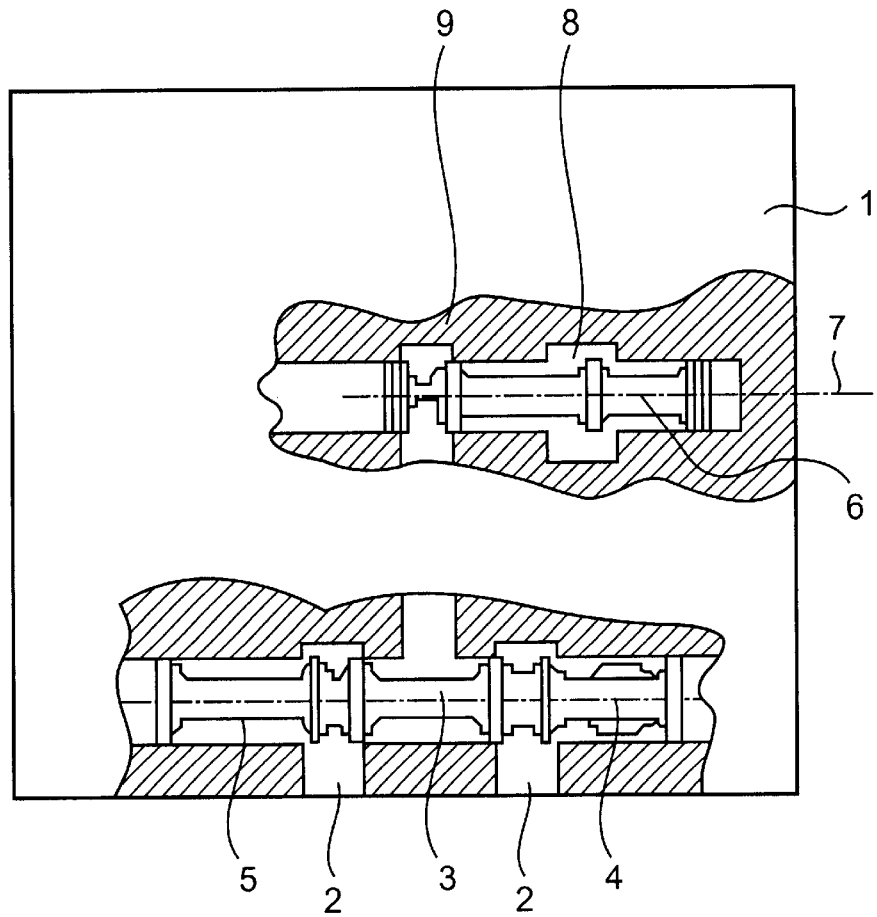
FIG. 1 shows a schematic fragmentary section through a high-pressure hydraulic valve.
Figure 2:
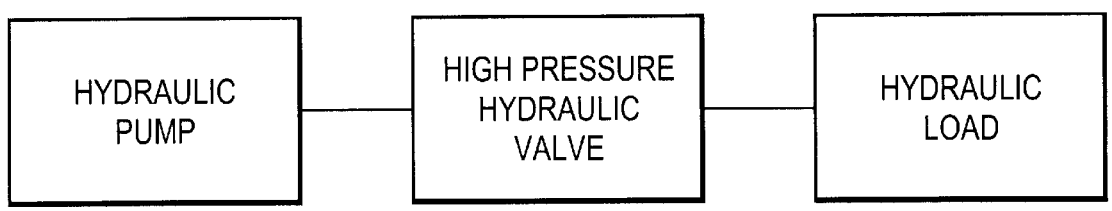
FIG. 2 shows in diagrammatic form a hydraulic system which includes the high-pressure hydraulic valve.

Reference numeral 1 represents a housing, which is block-shaped. According to the invention, this housing 1 comprises a precipitation-hardenable wrought aluminum alloy, for instance of the type AlZnMgCu. In the interior of the housing 1, there are hollow spaces, in which functional components are located. The hollow spaces are machined out of the block, for instance by drilling and/or milling. Thus the high-pressure hydraulic valve has two connections 2, one of which communicates, via a hydraulic line 10 (FIG. 2), with the hydraulic load 11, such as a hydraulic actuator. The other connection leads via the same kind of hydraulic line 12 to a pump 13, also depicted in FIG. 2.

The high-pressure hydraulic valve shown in the drawing is a module, which along with a proportional multiposition valve and a two-way pressure compensator also contains other elements, but these are not shown here because they are not essential to the invention. Examples of such other elements are adjusting devices for maximum pressure, maximum stroke, and pressure difference.

As functional components that are disposed inside the housing 1 and that vary the flow of hydraulic oil, the following can be seen in the drawing: a main control spool 3, which is disposed displaceably along its axis 4 in a first chamber 5, and a pressure compensator spool 6, which is disposed displaceably along its axis 7 in a further chamber 8. The pressure compensator spool 6, together with part of the wall of the chamber 8, can form a check valve 9. The above elements determine the mode of operation of the high-pressure hydraulic valve. However, they will not be described further here, because their mode of operation is not essential to the invention.

In high-pressure hydraulic valves of this kind in the prior art, the functional parts, such as the main control spool 3 and the pressure compensator spool 6, are made of hardened steel. The hardening is done at the conclusion of the production process. However, since dimensional changes known as warping occur in the heat treatment, and especially in parts machined by metal cutting, remachining is typically necessary in order to achieve the required dimensional precision of the parts for the sake of the function.

If the functional parts that influence the flow of hydraulic oil, such as the main control spool 3 and the pressure compensator spool 6, comprise hardened steel, while the housing 1 comprises a wrought aluminum alloy, then for designing the construction and the dimensions and tolerances of the parts, it must be taken into account that the coefficients of thermal expansion of steel and aluminum alloys are markedly different, namely about $12 \times 10^{-6}/°$ C. for steel, and approximately twice as high, namely 23 to $24 \times 10^{-6}/°$ C. for aluminum alloys. In hydraulic systems that are stationary when in operation, this difference does not play a significant role, for instance if the system is set up in a factory space. In mobile systems that have hydraulic devices, such as cranes and dredgers, however, because these devices are used in the open quite considerable temperature differences occur because of changing meteorological conditions. Accordingly, the incident maximum temperature values have to be considered in designing the parts. This is feasible per se, especially since the temperature also acts on the properties of the hydraulic oil, so that the engineer designing the high-pressure hydraulic valve has to take temperature factors into account anyway.

However, it is advantageous if the functional parts, such as the main control spool 3 and pressure compensator spool 6, are also of a precipitation-hardenable wrought aluminum alloy, such as AlZnMgCu. Thus at temperatures that depart from the normal, no additional problems with tolerances that would have to be taken into account occur.

It is advantageous if the blank, such as a blocklike body, that exists before the machining is done to form the housing 1, is already in the precipitation-hardened state. The machining to form the finished housing is accordingly done in the already precipitation-hardened state. This has a number of advantages: First, the manufacturer of the parts does not need any heat treatment system suitable for the precipitation-hardening of the material. On the other hand, as a result of the precipitation-hardening, dimensional changes in the housing 1 machined to final form no longer occur. However, a highly essential advantage results from the fact that the metal-cutting machining is made easier. Aluminum materials are generally known to be ductile and tough. This requires specially ground metal-cutting tools and nevertheless very often leads to the creation of so-called built-up edges, which also adversely affects the dimensional stability. It has been found that the cutting conditions are substantially more favorable when the machining is done in the precipitation-hardened state. Thus work can be done with cutting speeds that are even higher than those in gray cast iron.

What has been said about the production of the housing 1 applies equally to the functional parts to be made from a precipitation-hardenable wrought aluminum alloy, such as the main control spool 3 and pressure compensator spool 6.

Following the production of the parts, that is, the housings 1, main control spool 3, pressure compensator spool 6, and the like, the anodic oxidation of the parts will advantageously be done. It should be taken into account that the buildup of the film during the anodic oxidation causes a dimensional change. Starting at the surface, aluminum atoms are converted into aluminum oxide molecules. The film thus increases in depth on the one hand but on the other also leads to an increase in size, since the aluminum oxide formed in the anodic oxidation takes up more space. The dimensional changes are controllable, however, because they are associated strictly with the thickness of the film formed. It is accordingly possible to manufacture the crude parts with a certain undersize, from which by the creation of an oxide film, given a certain thickness of the oxide film, a finished part that is precisely dimensionally stable is created.

The oxide film created anodically advantageously has a thickness of about 200 $\mu$m.

Because the aluminum oxide film has the property of being a very poor electrical conductor, in a mixed construction with aluminum and steel, the additional advantage is also attained that contact corrosion between metal components of different material with a different position in the electrical voltage series is maximally precluded. This is significant even in the advantageous case, since both the housing 1 and the functional parts, such as the main control spool 3, pressure compensator spool 6 and the like, are made from a wrought aluminum alloy, because springs, for instance, that act on such functional parts and/or are braced on the housing 1 are typically made of steel.

In the housing 1, the film created by the anodic oxidation simultaneously meets multiple demands. On the surface parts located on the outside, the film created functions both to protect against corrosion and to provide an aesthetically attractive appearance. Even painting the surface, which is usually done, can accordingly even be dispensed with under some circumstances. However, if painting is still desired, then the anodically created oxide film offers an excellent base for adhesion, so that the adhesion base preparation and priming, which as a rule are necessary in workpieces of aluminum materials and are especially complicated, can be omitted.

On the surfaces of the internal hollow spaces and chambers such as chamber 5 for the main control spool 3 and chamber 8 for the pressure compensator spool 6, not only corrosion protection but above all wear protection is of prime importance. It has been found that high-pressure hydraulic valves of the type described above, having the characteristics of the invention and the films created by anodic oxidation and found to be advantageous, are extraordinarily wear-resistant. They are not inferior to conventional valves in terms of their service life.

It has been found, especially strikingly, that the hysteresis of a high-pressure hydraulic valve of this kind is less than in conventional valves. This reduced hysteresis has a very advantageous effect in terms of the precision of positioning in hydraulic adjusting devices as well as with regard to acceleration and deceleration operations. In other words, the dynamic behavior is markedly improved.

The exemplary embodiment described above pertains one specific embodiment of a high-pressure hydraulic valve. In other designs of high-pressure hydraulic valves, the functional parts are sometimes called by other names. The functional parts are accordingly understood to include these other kinds of parts as well, such as valve bodies, valve cones, open- and closed-loop control spools, and so forth.

Without departing from the scope of the invention, the housing 1 can also be made from a precipitation-hardenable cast aluminum alloy, with the production of a blank for the housing 1 being done by casting. The general teaching of the invention is accordingly that the housing 1 is made from a precipitation-hardenable aluminum alloy. The anodic oxidation can advantageously also be done in the same way when a cast aluminum alloy is used.

What is claimed is:

1. In a high pressure hydraulic system operable at hydraulic fluid pressures above 100 bar and comprising a pump for providing pressurized hydraulic fluid to a hydraulic load, and a high pressure hydraulic valve for varying the flow of hydraulic fluid between said pump and said hydraulic load, the improvement which comprises a valve housing of precipitation hardened aluminum alloy having at least one chamber therein for receiving a movable functional part for affecting the flow of the hydraulic fluid.

2. The combination of claim 1, wherein said precipitation hardened aluminum alloy is an AlZnMgCu alloy.

3. The combination of claim 1 or 2, wherein said valve housing has anodically oxidized surfaces to protect against wear and corrosion.

4. The combination of claim 1, wherein surfaces of said aluminum alloy valve housing comprise an approximately 200 $\mu$m thick anodically created oxide film.

5. The combination of claim 1, wherein said functional part comprises a precipitation hardened aluminum alloy.

6. The combination if claim 5, wherein said functional part is a valve spool, and surfaces of said valve housing and said spool comprise an anodically created aluminum oxide film.

7. The combination of claim 1, wherein said functional part comprises an AlZnMgCu alloy.

8. A method for producing a hydraulic valve according to claim 1, said method comprising the steps of precipitation hardening the valve housing by heat treatment, and then shaping the housing by at least one metal-cutting process.

9. A method according to claim 8, comprising the additional step of anodically oxidizing surfaces of said housing after said metal cutting.

10. A method according to claim 8, wherein a blank for said housing is cast from a precipitation-hardenable aluminum alloy.

11. A method according to claim 8, wherein a blank for said housing is wrought from a precipitation-hardenable aluminum alloy.

12. A method according to claim 11, wherein said alloy is an AlZnMgCu alloy.

13. A method according to claim 8, additionally including comprising forming said movable functional part of said valve from a precipitation-hardenable wrought aluminum alloy.

14. A method according to claim 13, wherein said movable functional part is formed of an AlZnMgCu alloy.

15. A method according to claim 13, additionally comprising anodically oxidizing surfaces of said functional part.

* * * * *